US012679161B2

(12) United States Patent (10) Patent No.: US 12,679,161 B2
Kaldas (45) Date of Patent: Jul. 14, 2026

(54) METHODS AND APPARATUS FOR OPERATING VEHICLES INCLUDING CONTINUOUSLY CONTROLLED DAMPING SYSTEMS

(71) Applicant: Ford Global Technologies, LLC, Dearborn, MI (US)

(72) Inventor: Mina Kaldas, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/201,578

(22) Filed: May 7, 2025

(65) Prior Publication Data

US 2025/0360771 A1 Nov. 27, 2025

(30) Foreign Application Priority Data

May 21, 2024 (DE) .......................... 102024114075.5

(51) Int. Cl.
*B60G 17/018* (2006.01)
*B60G 17/016* (2006.01)
*B60G 17/08* (2006.01)

(52) U.S. Cl.
CPC ....... *B60G 17/0182* (2013.01); *B60G 17/016* (2013.01); *B60G 17/08* (2013.01);
(Continued)

(58) Field of Classification Search
CPC .. B60G 17/0182; B60G 17/016; B60G 17/08; B60G 2400/0511; B60G 2400/0521; B60G 2400/252; B60G 2500/30; B60G 2800/012
See application file for complete search history.

(56) References Cited

U.S. PATENT DOCUMENTS 6,593,849 B2 * 7/2003 Chubb ................ B60R 16/0233
180/172
8,364,365 B2 * 1/2013 Brewer ................... G06F 17/00
701/72
(Continued)

FOREIGN PATENT DOCUMENTS

DE 102004022919 A1 12/2005
DE 102010048260 A1 4/2012
(Continued)

OTHER PUBLICATIONS

German Patent and Trademark Office, "Search Report," issued Mar. 7, 2025 in connection with German Patent Application No. 102024114075.5, 9 pages (including machine translation).

*Primary Examiner* — Toan C To
(74) *Attorney, Agent, or Firm* — Lorne Forsythe; Hanley, Flight & Zimmerman, LLC

(57) ABSTRACT

The disclosure relates in general to a vehicle and to a method for operating a vehicle methods and apparatus for operating vehicles including continuously controlled damping systems. An example vehicle includes a first height sensor and a second height sensor coupled to a first axle, and a third height sensor coupled to a second axle, the height sensors configured to determine vertical positions, a rotation-rate sensor configured to sense a relative roll angle of a rotation of the vehicle about a longitudinal axis, machine readable instructions, and a control device coupled to the height sensors and the rotation-rate sensor, the machine readable instructions to cause the control device to determine an estimated vertical position of the second axle based on the vertical positions and the relative roll angle.

18 Claims, 5 Drawing Sheets

(52) U.S. Cl.

CPC ................. *B60G 2400/0511* (2013.01); *B60G
2400/0521* (2013.01); *B60G 2400/252*
(2013.01); *B60G 2500/30* (2013.01); *B60G
2800/012* (2013.01)

(56) References Cited

U.S. PATENT DOCUMENTS

| | | | |
|---|---|---|---|
| 11,807,249 | B2 | 11/2023 | Nasu et al. |
| 11,813,912 | B1 * | 11/2023 | Ford ..................... B60G 17/056 |
| 11,859,571 | B2 * | 1/2024 | Rollinger ................ G01P 15/00 |
| 2003/0236603 | A1 * | 12/2003 | Lu ....................... B60G 17/0165 |
| | | | 340/440 |
| 2005/0236896 | A1 * | 10/2005 | Offerle ................... B62D 9/002 |
| | | | 303/146 |
| 2007/0067080 | A1 | 3/2007 | Messih et al. |
| 2007/0067085 | A1 * | 3/2007 | Lu ......................... B60W 40/114 |
| | | | 340/440 |
| 2008/0228352 | A1 * | 9/2008 | Brookes ................. B60G 21/10 |
| | | | 280/5.514 |
| 2010/0036557 | A1 | 2/2010 | Lu |
| 2011/0130926 | A1 | 6/2011 | Lu et al. |
| 2021/0023904 | A1 * | 1/2021 | Kasuya ................ B60G 17/016 |
| 2022/0016949 | A1 * | 1/2022 | Graus .................... B60G 17/08 |

FOREIGN PATENT DOCUMENTS

| | | | |
|---|---|---|---|
| DE | 102014014297 | A1 | 3/2016 |
| DE | 102017206055 | A1 | 10/2017 |
| DE | 102020202156 | A1 | 8/2021 |
| JP | 7121690 | B2 | 8/2022 |
| KR | 102533560 | B1 | 7/2021 |

* cited by examiner

METHODS AND APPARATUS FOR OPERATING VEHICLES INCLUDING CONTINUOUSLY CONTROLLED DAMPING SYSTEMS

RELATED APPLICATION

This patent claims priority from DE Patent Application No. 102024114075.5, which was filed on May 21, 2024, and is hereby incorporated herein by reference in its entirety.

FIELD OF THE DISCLOSURE

The disclosure relates in general to methods and apparatus for operating vehicles including continuously controlled damping systems.

BACKGROUND

Continuously controlled damping (CCD) is a system or method for an electronically controlled chassis to enable reduced motions about the vertical, longitudinal and transverse axes (e.g., yawing motions, rolling motions, pitching motions, etc.). Realization of such damper control requires information about the motions of the vehicle body and the road wheels.

BRIEF DESCRIPTION OF THE DRAWINGS

In general, the same reference numbers will be used throughout the drawing(s) and accompanying written description to refer to the same or like parts.

SUMMARY

Figure 1:
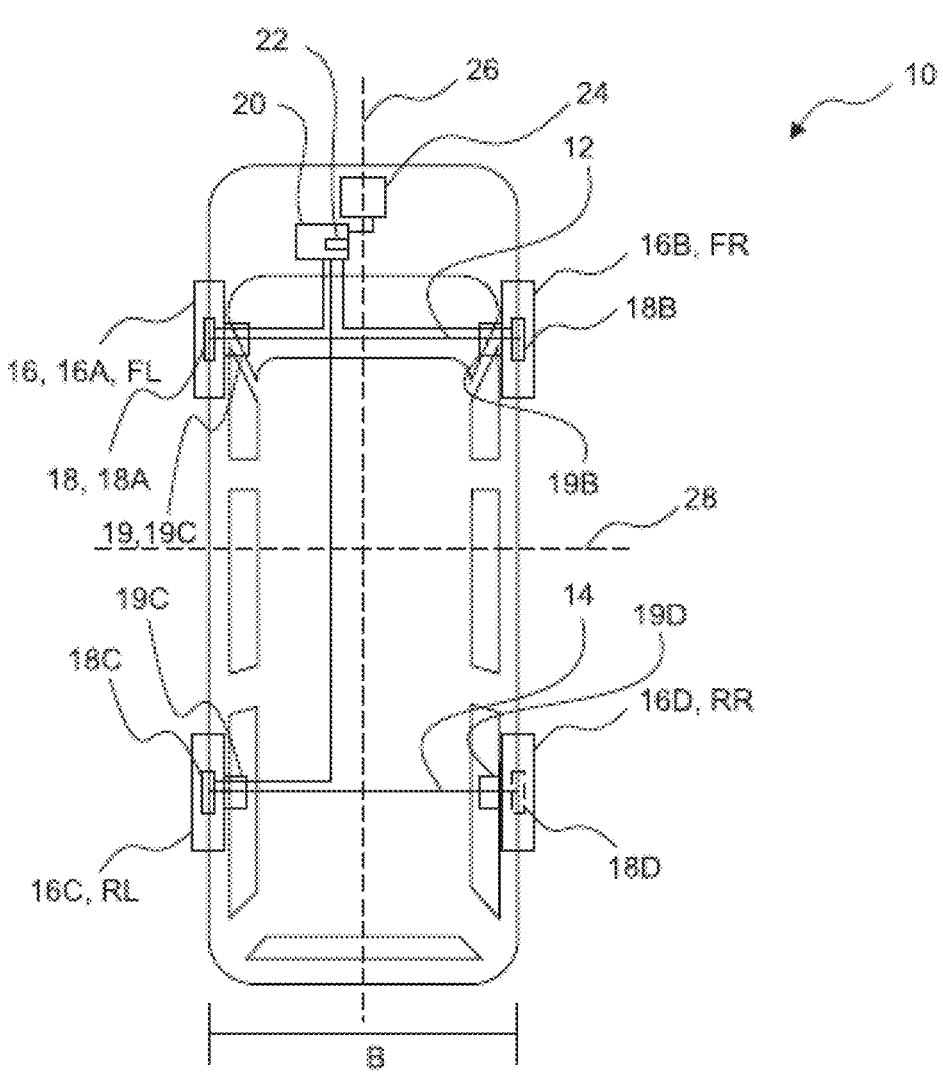
FIG. 1 shows a schematic representation of an example vehicle according to examples disclosed herein.

An example vehicle includes a first height sensor and a second height sensor coupled to a first axle, and a third height sensor coupled to a second axle, the height sensors configured to determine vertical positions, a rotation-rate sensor configured to sense a relative roll angle of a rotation of the vehicle about a longitudinal axis, machine readable instructions, and a control device coupled to the height sensors and the rotation-rate sensor, the machine readable instructions to cause the control device to determine an estimated vertical position of the second axle based on the vertical positions and the relative roll angle.

An example method for operating a vehicle including a first height sensor and a second height sensor coupled to a first axle of the vehicle, a third height sensor coupled to a second axle of the vehicle, and a rotation sensor, the method includes determining a first vertical position of the first axle based on first data from the first height sensor and the second height sensor, determining a relative roll angle of a rotation of the vehicle about a vehicle longitudinal axis based on second data from the rotation sensor, and estimating a second vertical position of the second axle, based on third data from the third height sensor and the second data.

An example apparatus for adjusting a setpoint of a spring-damper unit of a vehicle includes machine readable instructions, and programmable circuitry to execute the machine readable instructions to determine a first vertical position of a first axle based on first data from a first height sensor and a second height sensor, determine a roll angle of a rotation of the vehicle, determine a second vertical position of a second axle based on the first vertical position and the roll angle, and adjust the setpoint of the spring-damper unit based on the first vertical position, the second vertical position, and the roll angle.

DETAILED DESCRIPTION

In known continuously controlled damping (CCD) systems, four height sensors (e.g., two per axle) are used to measure the relative vertical motion between a vehicle body and road wheels. Furthermore, a sensor arrangement (e.g., a sensor cluster, a rotation-rate sensor, etc.) is used in combination with an estimation algorithm to estimate the body motions.

Previous approaches, such as, for example, those known from US 2010/0036557 A1, US 2007/0067080 A1, US 2011/0130926, KR 10-2533560 B1, JP 7121690 B2, and US 2007/0067085, disclose systems that have four height sensors, which makes the systems elaborate, as each sensor has installation space requirements and results in increased weight. Additionally, the amount of cabling is increased by the large number of sensors, making the systems complex.

Other approaches, such as that known from DE 10 2017 206 055 A1, disclose systems that have only two height sensors, which limits comfort for the user of the vehicle.

Examples disclosed herein overcome the disadvantages of known methods for operating a vehicle. In particular, examples disclosed herein provide methods for operating a vehicle in such a way that a high level of control precision is combined with a low resource input regarding the compensation of motion of the vehicle. Further, examples disclosed herein provide vehicles that enable a high level of control precision combined with a low resource input regarding the compensation of motion of the vehicle.

Some examples disclosed herein are reflected in the independent claims. The dependent claims and the following description, each of which, (e.g., individually or in (sub) combination) may represent aspects of the described examples. Some features are explained with respect to example methods, others with respect to example devices. However, the corresponding aspects can be assigned mutually in an appropriate manner.

According to one aspect, some examples of the disclosure relate to an example vehicle. The vehicle includes at least a front axle, a rear axle, three height sensors, a rotation-rate sensor (e.g., rotation sensor) and a control device. The control device is coupled to at least the three height sensors and the rotation-rate sensor. Two height sensors are coupled to one of the front axle and the rear axle. A further height sensor is coupled to the other of the front axle and the rear axle. The height sensors are each configured to sense a vertical position. The rotation-rate sensor is configured to sense a relative roll angle of a rotation of the vehicle about a vehicle longitudinal axis. The control device includes a state estimation algorithm. The control device is configured to use the state estimation algorithm to estimate a complementary vertical position (e.g., estimated vertical position) at the other of the front axle (e.g., first axle) and the rear axle (e.g., second axle) based on the sensed vertical positions and the sensed relative roll angle.

The example vehicle generally ensures a high level of precision in the compensating of motions of the vehicle An additional vertical position for the vehicle may be determined from the other measurement values, using an estimation algorithm. Consequently, the position (e.g., for determining all relevant positions and angles) of the vehicle can be determined, which ultimately enables the control device to determine necessary actuating parameters that may be used to at least partially compensate for motions of the vehicle. Using an estimating algorithm enables cabling and necessary installation space of additional sensors to be eliminated, thus, reducing the complexity of the vehicle.

Some examples of the disclosure relate to a method for operating a vehicle. The vehicle includes at least a front axle, a rear axle, three height sensors, a rotation-rate sensor and a control device. The control device is coupled to at least the three height sensors and the rotation-rate sensor. Two height sensors are coupled to one of the front axle and the rear axle. A further height sensor is coupled to the other of the front axle and the rear axle. The method includes at least the following operations. Vertical positions are sensed by the height sensors, a relative roll angle of a rotation of the vehicle about a vehicle longitudinal axis is sensed by the rotation-rate sensor, and a complementary vertical position at the other of the front axle and the rear axle is estimated by a state estimation algorithm of the control device based on the sensed vertical positions and the sensed relative roll angle.

The advantages provided by the example vehicle described above are also achieved in a corresponding manner by the described example method.

A height sensor may be regarded as a sensor device that is configured such that it is able to sense a relative vertical position or an absolute vertical position (e.g., with respect to a reference point). The sensed vertical position is transmitted, as a corresponding measurement value, to the control device.

In some examples, the rotation-rate sensor is configured to sense a relative angle of motion (e.g., rotation) of the vehicle about the vehicle longitudinal axis (e.g., relative roll angle). In some examples, rotation-rate sensors can sense an absolute angle of such a motion.

In some examples, the vertical positions sensed by the different height sensors are linked to each other. In other words, the sensor data sensed by each of the height sensors are linked to each other. This means that the state estimation algorithm applies the concept of sensor fusion so that the complementary vertical position can be estimated. The sensor fusion is based on the vertical positions determined by measurement, which can be used to determine the position and orientation of the body of the vehicle.

In some examples, the control device includes a Kalman filter. The control device is then configured to determine, based on the Kalman filter and the relative roll angle sensed by the rotation-rate sensor, an absolute roll angle of the rotation of the vehicle about the vehicle longitudinal axis, and to consider the absolute roll angle in the state estimation algorithm.

In such examples, the method further includes the following additional operations. An absolute roll angle of the rotation of the vehicle about the vehicle longitudinal axis is determined based on the Kalman filter of the control device, and the absolute roll angle is considered in the state estimation algorithm in estimating the complementary vertical position.

The Kalman filter is used to estimate system variables that cannot be measured directly, while the errors of the measurements are optimally reduced. Determining the absolute roll angle therefore makes it possible to enable greater precision in estimating the complementary height information.

In some examples, the control device also includes continuously controlled damping (CCD). The CCD is configured to determine, based on the sensed vertical positions and the estimated complementary vertical position, adjust a suspension travel setpoint for spring-damper units of the vehicle. The CCD enables a rolling motion of the vehicle about the vehicle longitudinal axis to be at least partially compensated. In this way, the complementary vertical position, which is estimated via an example method described above, is used to compensate rolling motions of the vehicle about the vehicle longitudinal axis. As a result, a high level of comfort can be provided for users of the vehicle.

Regarding the rolling motion of the vehicle, it is assumed that the absolute roll angle about the vehicle longitudinal axis is uniform (e.g., the vehicle includes an approximately rigid body). As a result, twisting about and along the vehicle longitudinal axis can be disregarded.

According to some examples, only rolling motions that have a frequency above a predefined threshold value (e.g., 10 Hz) are considered in the continuously controlled damping, using a high-pass filter. By using a high-pass filter, only the higher-frequency excursions (e.g., disturbances) relevant to driving are considered.

In some examples, the sensed vertical positions and the complementary vertical position are each assigned individually to a spring-damper unit of the vehicle. The control device is configured to determine the respective actual suspension travel of a spring-damper unit based on the vertical position or complementary vertical position assigned to the spring-damper unit. The control device is configured to consider a comparison of the continuously controlled damping of the determined actual suspension travel with the determined suspension travel setpoints. For example, the actual suspension travel and suspension travel setpoints may be considered as part of a closed-loop control circuit with feedback to reliably compensate the rolling motions of the vehicle.

In other words, the vertical positions sensed for a control interval and the estimated complementary vertical position indicate that specific actual suspension travel exist at that time-point. The rotation-rate sensor in turn indicates that a specific state exists for the vehicle rotation about the vehicle longitudinal axis. To compensate the vehicle rotation, specific suspension travel setpoints are required, which depend on the actual suspension travel (e.g., to prevent over-compensation) and the relative roll angle (e.g., or absolute roll angle). As a result, the control device can determine corresponding actuating signals, such that the actual suspension travel can be adjusted to the suspension travel setpoints.

In some examples, the vehicle can also include a further spring control device that performs the actual control of the spring-damper units. In such examples, the control device can transmit only the corresponding actuating signals or information about the suspension travel setpoints of the spring-damper units to the spring control device.

In some examples, the spring-damper units each include spring devices (e.g., a spring device) and damping devices (e.g., a damping device). The spring-damper units can then also be referred to as suspension struts. Combining spring devices and damping devices allows motions of the vehicle to be compensated according to the principle of vibration isolation. For example, vibrations close to an eigenfrequency of the spring devices can be rapidly reduced by the damping devices. Comfort is, thus, enhanced for the user of the vehicle.

In some examples, the height sensors are arranged at respective height sensor positions. The control device is then configured to estimate the complementary vertical position for a complementary height sensor position that is arranged in a complementary manner with respect to the height sensor positions.

In some examples, the height sensors are arranged at predefined positions on the body of the vehicle. Typically, the height sensor positions may be oriented in a fixed relationship to each other to simplify the determination of the complementary height information. In some examples, symmetries of the vehicle in respect to vehicle length, vehicle width, and/or vehicle height may be utilized to reduce the complexity of the underlying example method.

In some examples, the height sensor positions and the complementary height sensor position may be arranged in the shape of a trapezoid or a rectangle. A trapezoid is characterized by the fact that it has at least two parallel sides and two legs arranged between the parallel sides. In some examples, the trapezoid may have legs of equal length. The trapezoid is therefore symmetrical (e.g., with respect to the width of the vehicle). In some examples, the parallel sides of the trapezoid can be aligned along the front axle and the rear axle. In the case of a rectangle, symmetry along the length of the vehicle is also utilized.

In some examples, the complementary height sensor position is arranged substantially symmetrically along the width of the vehicle and with respect to an axle mid-point of the other of the front axle and the rear axle of the vehicle with the height sensor position of that height sensor that is individually assigned to the other of the front axle and the rear axle of the vehicle. The complementary height sensor position represents a notional sensor position of a notional height sensor, the complementary height information of which is estimated based on an example method explained above. The notional sensor position may now be thought of as being along a corresponding axis of the vehicle, for which so far there is only one sensor position of an existing height sensor, in such a way that the pair is arranged symmetrically along the width of the vehicle. The inputs involved in determining the suspension travel setpoints are thereby reduced.

In general, it is not necessary for the height sensor positions and the complementary height sensor position to be arranged utilizing the symmetry of the vehicle. Rather, it is only necessary that the relative position of the height sensor positions and the complementary height sensor position with respect to the body of the vehicle and in consideration of the position of the road wheels is constant, predefined, and known. Consequently, the relative attitudes can be taken into consideration within the underlying example method, thus requiring only a small amount of inputs.

It may be assumed that the vehicle includes a rigid body which includes relatively low amounts of twisting relative to the vehicle axles.

In some examples, the vehicle includes exactly three height sensors. This makes the vehicle less complex compared to existing approaches. Additionally, less installation space is required. It also enables space savings to be made in respect to the necessary cabling, contacting, and signal transmission.

From a mathematical point of view, the vehicle includes a vehicle width B between the mid-points of the wheels. Additionally, the control device can use the sensed height information and the known, predefined geometry of the vehicle body to determine height differences (e.g., relative displacements) $\Delta Z_{RL}, \Delta Z_{FL}, \Delta Z_{FR}$ between the body and the road wheels. As an example, it is assumed here that the three height sensors that are present are arranged at a rear-left (RL), a front-left (FL) and a front-right (FR) of the vehicle. However, there is no height sensor arranged at the complementary height sensor position rear-right (RR). Based on the height differences, the absolute roll angle of the vehicle about the vehicle longitudinal axis above a horizontal line $\phi_{ground}$ is obtained as follows:

$$\phi_{ground} = \frac{(\Delta Z_{FL} - \Delta Z_{FR})}{B}$$

Because the absolute roll angle of the vehicle is approximated as constant along the length of the vehicle (e.g., assuming no twisting of the vehicle), the following is obtained:

$$\Delta Z_{RR} = \Delta Z_{RL} - (\phi_{ground} \cdot B).$$

Consequently, the complementary height information $\Delta Z_{RR}$ not sensed and determined based on the relative roll angle sensed by the rotation-rate sensor can be estimated. The state estimation of the complementary height information may also be affected using the Kalman filter to estimate the absolute roll angle $\phi_{ground,absolute}$, enabling the quality of the signal direction to be enhanced.

The Kalman filter may then be used to consider the road slope (e.g., camber) $\phi_{road}$ that cannot be sensed, using the following equation:

$$\phi_{ground,absolute} = \phi_{ground} + \phi_{road}.$$

Consequently, the control device can also consider and, if necessary, output information about the road slope or, if these are sensed and/or known, increase the degree of precision in determining the absolute roll angle $\phi_{ground,absolute}$.

In the described example, the height sensors are assigned to the respective road wheels (e.g., they are also spaced at the distance B along the width of the vehicle). The height sensor positions and the complementary height sensor position correspond to the mid-points of the wheels along the width of the vehicle.

In general, the height sensor positions and the complementary height sensor position may also be orientated differently, in which case the corresponding geometry must then be considered in the above equations. If the sensors are arranged symmetrically along the width of the vehicle, this in turn leads to corresponding simplifications.

In some examples, the method is implemented as a computer-implemented method. This means that the method operations may be performed based on one or more data processing devices. For example, a data processing device may trigger or execute the corresponding operations.

According to a further aspect, examples described herein also relate to computer program products including instructions which, when the program is executed by a computer, cause the computer to execute the example methods as described herein. The advantages achieved by the methods described herein are also achieved in a corresponding manner by the computer program product.

According to an additional aspect, the examples described herein also relate to computer-readable storage mediums including instructions which, when the program is executed by a computer, cause the computer to execute example methods as described herein. The advantages achieved by the example methods described herein are also achieved in a corresponding manner by the computer-readable storage mediums.

Vehicles may include land vehicles, namely, inter alia, off-road and on-road vehicles such as passenger cars, buses, trucks, and other commercial vehicles. Vehicles may be manned or unmanned. Vehicles may be at least partially electrically powered, have an internal combustion engine, and/or an electric motor used for propulsion.

All of the features explained regarding the various aspects can be combined individually or in (sub)combination with other aspects.

The disclosure, and further described examples and developments thereof, are described and explained in more detail below with reference to the examples represented in the drawings.

The following detailed description in conjunction with the accompanying drawings, in which elements that are the same are denoted by the same numbers, is intended as a description of various examples of the disclosed subject-matter and is not intended to represent the only examples. Any example described in this disclosure is by way of example or illustration only and should not be construed as preferred or advantageous over other examples. The illustrative examples contained herein are not intended to be exhaustive and do not limit the claimed subject matter to the exact forms disclosed. Various modifications of the examples described will be readily apparent to a person skilled in the art, and the general principles defined herein may be applied to other examples and applications without deviating from the spirit and scope of the examples described. Therefore, the examples described are not limited to the examples shown but have the widest possible scope of application consistent with the principles and features disclosed herein.

All features disclosed below with respect to the described examples and/or the accompanying figures may be combined, alone or in any sub-combination, with features of the aspects of the described examples, provided that the resulting combination of features is meaningful for a person skilled in the art.

For the purposes of the disclosure, the phrase "at least one of A, B and C" means, for example, (A), (B), (C), (A and B), (A and C), (B and C) or (A, B and C), including any further possible combinations when more than three elements are listed. In other words, the term "at least one of A and B" generally means "A and/or B", namely "A" alone, "B" alone or "A and B".

FIG. 1 shows a schematic representation of a vehicle 10 according to one example. The vehicle 10 includes a front axle 12 and a rear axle 14. The vehicle 10 additionally includes road wheels 16. A front left road wheel 16A (FL) is coupled to the front axle 12, as is a front right road wheel 16B (FR). A rear left road wheel 16C (RL) is coupled to the rear axle 14, as is a rear right road wheel 16D (RR). The corresponding abbreviations FL, FR, RL, RR correspond to the respective wheel positions front left, front right, rear left, and rear right. For simplicity, the corresponding abbreviations are used accordingly hereinafter and in the drawings. Additionally, the vehicle 10 includes a plurality of height sensors 18. The height sensors 18 are in general assigned to respective road wheels 16.

According the illustrated example, a front left height sensor 18A is arranged with respect to the vehicle transverse axis 28 centrally with a mid-point of the front left road wheel 16A. In other words, the positions of the front left height sensor 18A and of the front left road wheel 16A correspond to each other along the vehicle transverse axis 28. Similarly, a front right height sensor 18B is arranged with respect to the vehicle transverse axis 28 centrally with a mid-point of the front right road wheel 16B. Additionally, a rear left height sensor 18C, in this top view of the vehicle 10, is arranged with respect to the vehicle transverse axis 28 centrally with a mid-point of the rear left road wheel 16C.

According to existing approaches, a rear right height sensor 18D would now be provided to be arranged with respect to the vehicle transverse axis 28 centrally with a mid-point of the rear right road wheel 16D. However, this is omitted according to the illustrated example, which is why it is also represented by a dashed line.

In some examples, one of the other height sensors 18 may of course be omitted instead of the rear right height sensor 18D. The explanations should then be applied accordingly.

In addition, the vehicle 10 includes spring-damper units 19, which are likewise assigned to respective road wheels 16. As a result, the height sensors 18 are also assigned to corresponding spring-damper units 19. There is a corresponding spring-damper unit 19 individually assigned to each road wheel 16.

The spring-damper units 19 include spring devices and damping devices. Via the spring-damper units 19 (e.g., suspension struts), rolling motions of the vehicle 10 about the vehicle longitudinal axis 26 may be at least partially compensated (e.g., reduced). In other words, the rolling motions may be reduced via the spring-damper units 19.

The vehicle 10 also includes a control device 20 that includes at least one data processing device 22.

The vehicle 10 additionally includes a rotation-rate sensor 24, which is configured to sense a relative roll angle of a rolling motion (e.g., rotation) of the vehicle 10 about the vehicle longitudinal axis 26.

The control device 20 is coupled to the height sensors 18A, 18B, 18C and the rotation-rate sensor 24.

In the illustrated example, the vehicle 10 is symmetrical corresponding to the vehicle transverse axis 28. The distance between the mid-points of road wheels 16 of a vehicle axis is B.

In general, the height sensors 18 do not have to be positioned in such a way that their height sensor positions correspond to the mid-points of the corresponding road wheels 16. However, the present symmetrical arrangement corresponding to a rectangle reduces the complexity required.

Figure 3A:
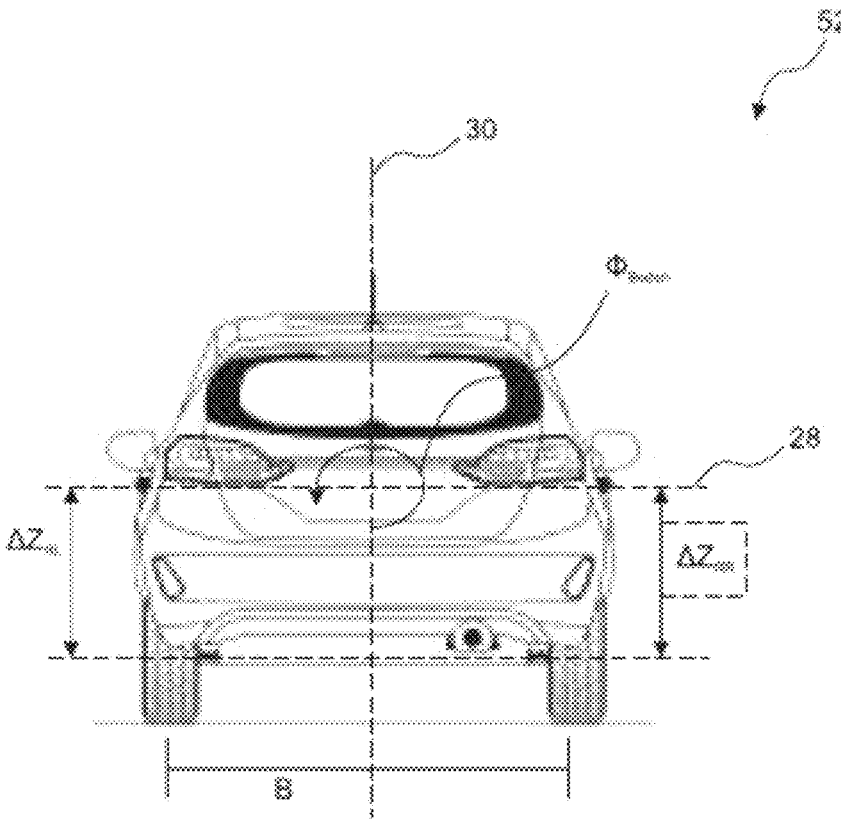
FIGS. 3A and 3B show schematic representations of the example vehicle of FIG. 1.
Figure 3B:
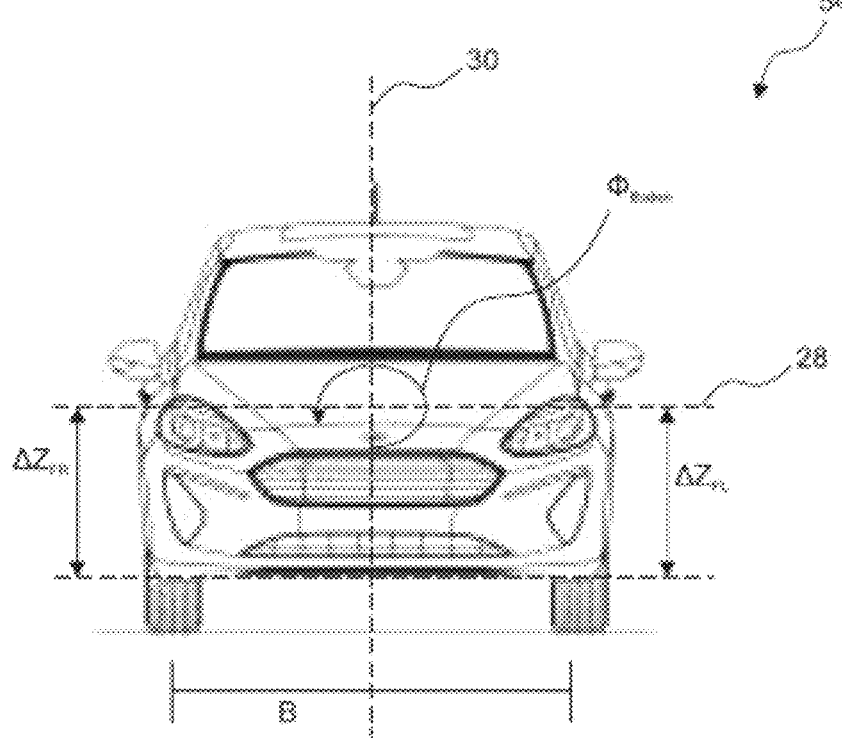

FIGS. 3A and 3B show schematic representations of the vehicle 10 according to an example corresponding to a rear view 52 (FIG. 3A) and a front view 54 (FIG. 3B). The vehicle 10 may rotate about the vehicle longitudinal axis 26 (e.g., due to uneven ground or a road slope) causing a relative roll angle $\phi_{ground}$. As a result, at the positions of the respective road wheels 16, the vehicle 10 exhibits height differences (e.g., relative displacements) $\Delta Z_{RL}, \Delta Z_{FL}, \Delta Z_{FR}, \Delta Z_{RR}$ parallel to the vehicle's vertical axis 30, between the body and the road wheels 16. At the positions of those road wheels 16 to which respective height sensors 18 are assigned, the height differences may be determined directly based on the measurement values of the height sensors 18. Here, it is the three height differences $\Delta Z_{RL}, \Delta Z_{FL}, \Delta Z_{FR}$.

Because there is no height sensor 18D assigned to the rear right road wheel 16D, the corresponding height difference $\Delta Z_{RR}$ cannot be readily determined (therefore represented by a dashed line).

To compensate or damp the rolling motion of the vehicle 10 about the vehicle longitudinal axis 26, the corresponding height difference $\Delta Z_{RR}$ is required so that corresponding suspension travel setpoints can be determined for the spring-damper units 19 that are assigned to the respective road wheels 16. The suspension travel setpoints are then such that the rolling motion of the vehicle 10 may be reduced rapidly.

Figure 2:
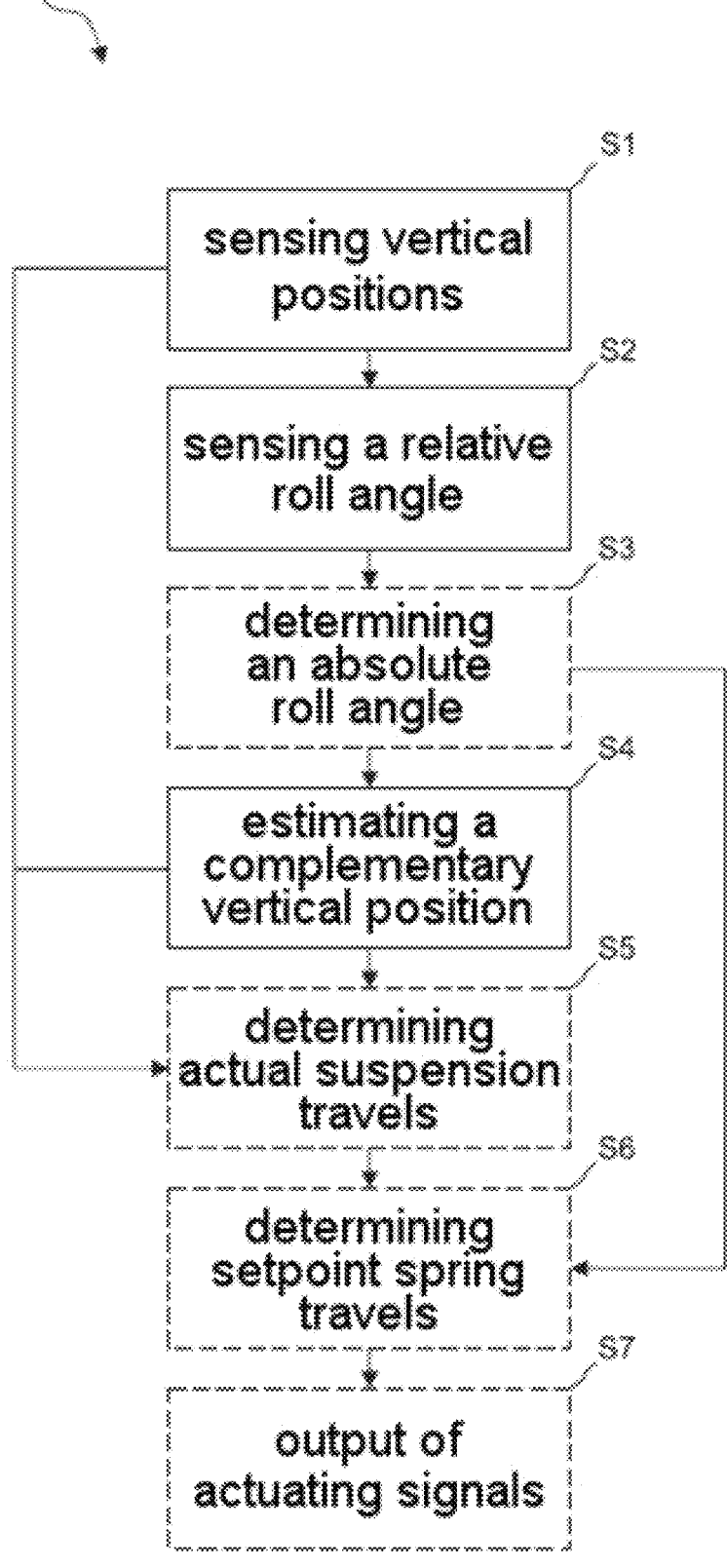
FIG. 2 is a flowchart representative of example machine-readable instructions and/or example operations that may be executed, instantiated, and/or performed by example programmable circuitry to implement example methods disclosed herein for operating a vehicle.
Figure 4:
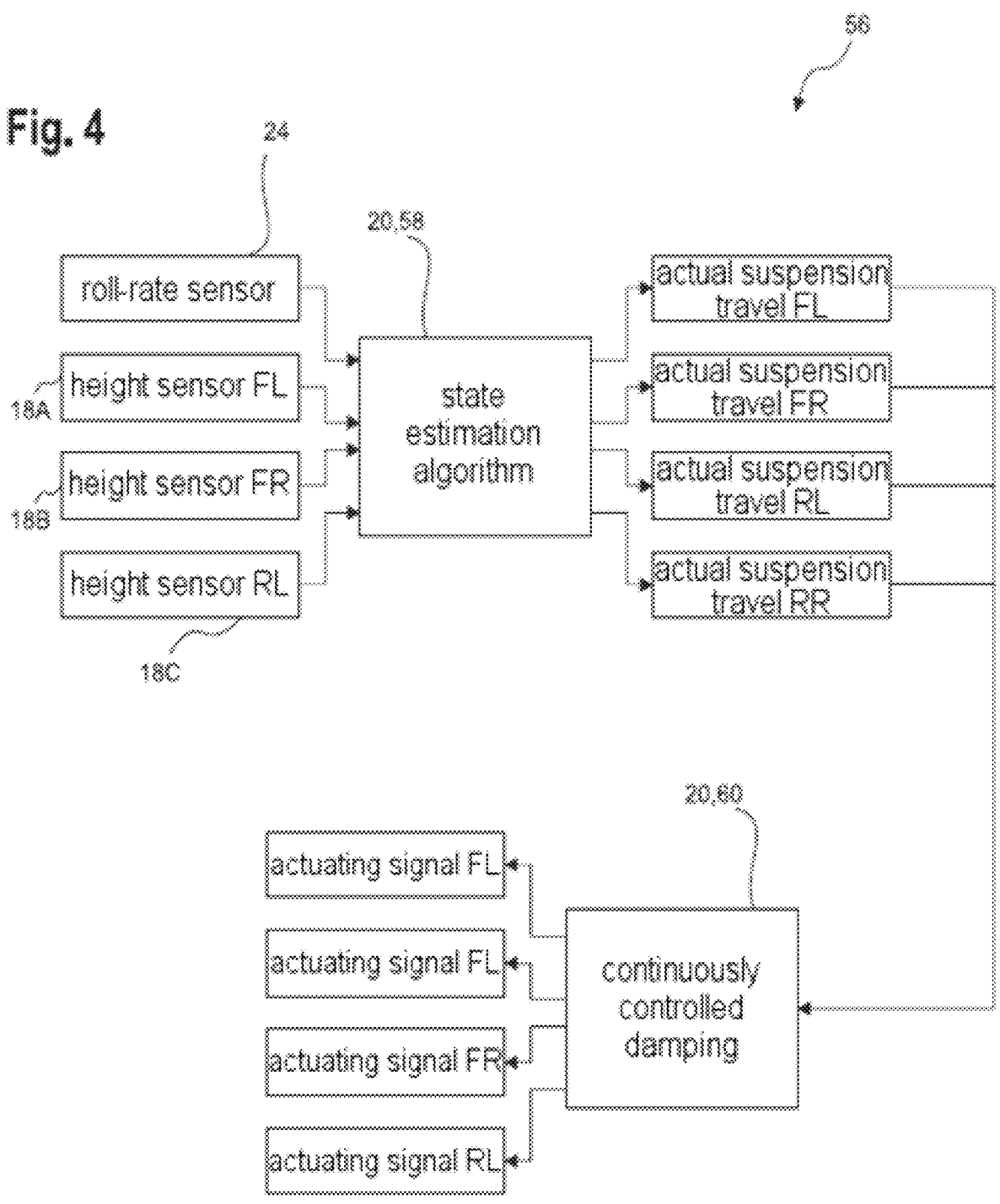
FIG. 4 shows a schematic representation of continuously controlled damping performed by an example control device.

FIG. 2 is a flowchart representative of example machine-readable instructions and/or example operations that may be executed, instantiated, and/or performed by example programmable circuitry to implement example methods disclosed herein for operating a vehicle. Optional operations are represented by dashed lines. Regarding the method 50, FIG. 4 shows a schematic representation of a control scheme 56 of the continuously controlled damping 60 performed by the control device 20 of FIG. 1.

According to operation S1, vertical positions are sensed by the three existing height sensors 18A, 18B, 18C at the respective height sensor positions.

Subsequently, according to operation S2, a relative roll angle $\phi_{ground}$ of a rotation of the vehicle 10 about the vehicle longitudinal axis 26 is sensed by the rotation-rate sensor 24. The corresponding measurement values of the height sensors 18 and of the rotation-rate sensor 24 are transmitted to the control device 20.

The control device 20 includes a state estimation algorithm 58 (see FIG. 4), which includes a Kalman filter. Using the Kalman filter, the absolute roll angle $\phi_{ground, absolute}$ may be determined based on the relative roll angle $\phi_{ground}$ in accordance with the optional operation S3. The Kalman filter is used to estimate and consider the road slope $\phi_{road}$ that cannot be sensed, in such a way that the error deviations are minimized or at least reduced.

As a result, according to operation S4, the complementary height sensor position of the non-present height sensor 18D may also be estimated by the state estimation algorithm 58 of the control device 20 based on the relative roll angle $\phi_{ground}$ (e.g., the absolute roll angle $\phi_{ground, absolute}$), and the sensed vertical positions. The control device 20 can apply the concept of sensor fusion in respect to the sensed vertical positions and the complementary vertical position.

Based on the sensed vertical positions and the complementary height sensor position, according to the optional operation S5 all height differences (e.g., relative displacements) $\Delta Z_{RL}, \phi Z_{FL}, \Delta Z_{FR}, \Delta Z_{RR}$ at the height sensor positions of the height sensors 18A, 18B, 18C that are present and at the complementary height sensor position of the non-present height sensor 18D are determined by the state estimation algorithm 58 of the control device 20 (see FIG. 4). Because the actual suspension travel of the spring-damper units 19 correspond directly to the height differences $\Delta Z_{RL}, \Delta Z_{FL}, \Delta Z_{FR}, \Delta Z_{RR}$, the control device 20 can, thus, determine what the current state of the spring-damper units 19 is, despite the vehicle 10 including only three height sensors 18.

Based on the relative roll angle $\phi_{ground}$ or the absolute roll angle $\phi_{ground, absolute}$, respective suspension travel setpoints of the spring-damper units 19 are then determined by the continuously controlled damping 60 of the control device 20, in accordance with the optional operation S6.

By comparing the suspension travel setpoints with the actual suspension travel, actuating signals are determined and output, in accordance with the optional operation S7, on the basis of a closed-loop control circuit of the control device 20 (e.g., a PI controller, PID controller, etc.) to adapt the actual suspension travel of the spring-damper units 19 to the suspension travel setpoint in such a way that the rolling motions of the vehicle 10, corresponding to the relative roll angle $\phi_{ground}$ about the vehicle longitudinal axis 26, are rapidly reduced.

Example instructions and/or operations of FIG. 2 may be implemented using executable instructions (e.g., computer-readable and/or machine-readable instructions) stored on one or more non-transitory computer-readable and/or machine-readable media. As used herein, the terms non-transitory computer-readable medium, non-transitory computer-readable storage medium, non-transitory machine-readable medium, and/or non-transitory machine-readable storage medium are expressly defined to include any type of computer-readable storage device and/or storage disk and to exclude propagating signals and to exclude transmission media. Examples of such non-transitory computer-readable medium, non-transitory computer-readable storage medium, non-transitory machine-readable medium, and/or non-transitory machine-readable storage medium include optical storage devices, magnetic storage devices, a hard disk drive (HDD), a flash memory, a read-only memory (ROM), a compact disc (CD), a digital versatile disc (DVD), a cache, a random-access memory (RAM) of any type, a register, and/or any other storage device or storage disk in which information is stored for any duration (e.g., for extended time periods, permanently, for brief instances, for temporarily buffering, and/or for caching of the information). As used herein, the terms "non-transitory computer-readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer-readable storage devices and/or non-transitory machine-readable storage devices include random-access memory of any type, read-only memory of any type, solid-state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer-readable instructions, machine-readable instructions, etc., and/or manufactured to execute computer-readable instructions, machine-readable instructions, etc.

In some examples, the control of the spring-damper units 19 may be affected by a further control device (not represented) of the vehicle 10, which receives only the corresponding actuating signals from the control device 20.

The described example vehicles and the described example methods enable only three height sensors 18 to be needed (e.g., eliminate one height sensor 18), which reduces the required resource input compared to existing approaches while at the same time ensuring high precision in the compensation of rolling motions of the vehicle. Thus, enabling a high level of comfort for a user of the vehicle.

Specific examples disclosed herein use circuitry (e.g., one or more circuits) to implement standards, protocols, methods, or technologies disclosed herein, to operably couple two or more components, generate information, process information, analyze information, generate signals, encode/decode signals, convert signals, transmit and/or receive signals, control other devices, etc. Circuits of any type may be used.

In some examples, a circuit such as the control device 20 includes, inter alia, one or more data processing devices such as a processor (e.g. a microprocessor), a central processing unit (CPU), a digital signal processor (DSP), an application-specific integrated circuit (ASIC), a field-programmable gate array (FPGA), a system on a chip (SoC), or the like, or any combination thereof, and may include discrete digital or analog circuit elements or electronics, or combinations thereof. In one example, the circuit comprises hardware circuit implementations (e.g., implementations in analogue circuits, implementations in digital circuits and the like, and combinations thereof).

In some examples, circuitry includes combinations of circuitry and computer program products having software or firmware instructions that are saved on one or more computer-readable memories and that act in combination to cause a device to execute one or more of the protocols, methods, or technologies described herein. In some examples, the circuit technology includes circuitry such as, for example, microprocessors or parts of microprocessors that require software, firmware and the like to operate. In some examples, the circuitry includes one or more processors or parts thereof and the associated software, firmware, hardware and the like.

Figure 5:
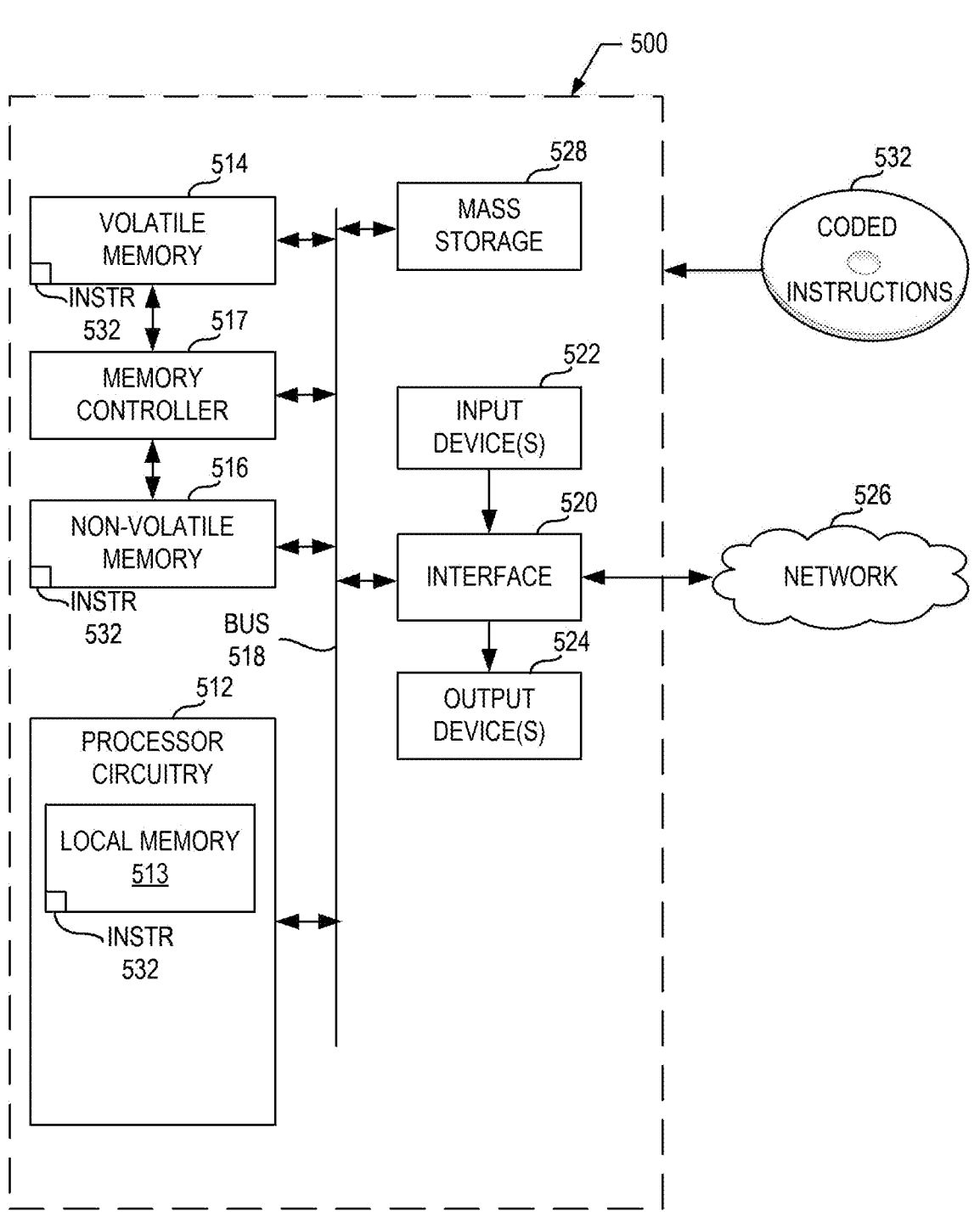
FIG. 5 is a block diagram of an example processing platform including programmable circuitry structured to execute, instantiate, and/or perform the example machine readable instructions of FIG. 2.

FIG. 5 is a block diagram of an example programmable circuitry platform 500 structured to execute and/or instantiate the example machine-readable instructions and/or the example operations of FIG. 2 to implement the control device 20 and/or its various components disclosed herein. The programmable circuitry platform 500 can be, for example, a control device, an ECU, a self-learning machine (e.g., a neural network), or any other type of computing and/or electronic device.

The programmable circuitry platform 500 of the illustrated example includes programmable circuitry 512. The programmable circuitry 512 of the illustrated example is hardware. For example, the programmable circuitry 512 can be implemented by one or more integrated circuits, logic circuits, FPGAs, microprocessors, CPUs, graphic processor units (GPUs), video processor units (VPUs), DSPs, and/or microcontrollers from any desired family or manufacturer. The programmable circuitry 512 may be implemented by one or more semiconductor based (e.g., silicon based) devices.

The programmable circuitry 512 of the illustrated example includes a local memory 513 (e.g., a cache, registers, etc.). The programmable circuitry 512 of the illustrated example is in communication with main memory 514, 516, which includes a volatile memory 514 and a non-volatile memory 516, by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517. In some examples, the memory controller 517 may be implemented by one or more integrated circuits, logic circuits, microcontrollers from any desired family or manufacturer, or any other type of circuitry to manage the flow of data going to and from the main memory 514, 516.

The programmable circuitry platform 500 of the illustrated example also includes interface circuitry 520. The interface circuitry 520 may be implemented by hardware in accordance with any type of interface standard, such as a controller area network (CAN), an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 522 are connected to the interface circuitry 520. The input device(s) 522 permit(s) a user (e.g., a human user, a machine user, etc.) to enter data and/or commands into the programmable circuitry 512. The input device(s) 522 can be implemented by, for example, an audio sensor, a microphone, a camera (still or video), a button, a touchscreen, and/or a voice recognition system.

One or more output devices 524 are also connected to the interface circuitry 520 of the illustrated example. The output device(s) 524 can be implemented, for example, by display devices (e.g., a light emitting diode (LED), an organic light emitting diode (OLED), a liquid crystal display (LCD), an in-place switching (IPS) display, a touchscreen, etc.), a tactile output device, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 500 of the illustrated example also includes one or more mass storage discs or devices 528 to store firmware, software, and/or data. Examples of such mass storage discs or devices 528 include magnetic storage devices (e.g., floppy disk, drives, hard disk drives (HDDs), etc.), optical storage devices (e.g., Blu-ray disks, CDs, DVDs, etc.), RAID systems, and/or solid-state storage discs or devices such as flash memory devices and/or solid state drives (SSDs).

The machine-readable instructions 532, which may be implemented by the machine-readable instructions of FIG. 2, may be stored in the mass storage device 528, in the volatile memory 514, in the non-volatile memory 516, and/or on at least one non-transitory computer readable storage medium such as a CD or DVD which may be removable.

Reference made to quantities and numbers, unless expressly stated, are not to be considered as limiting, but as examples of the possible quantities or numbers in the context of the described examples. In such examples, the description may also use the term "plurality" to refer to a quantity or number. In this context, the term "plurality" refers to any number greater than one, e.g. two, three, four, five, etc. The terms "about", "approximately", "close to" etc. mean plus or minus 5% of the stated value.

Although the disclosure has been represented and described with reference to one or more examples, a person skilled in the art, having read and understood this description and the accompanying drawings, may make equivalent changes and modifications.

Example methods, apparatus, systems, and articles of manufacture to enable operating a vehicle with an electronic steering system and electronic steering systems are disclosed herein. Further examples and combinations thereof include the following:

Example 1 includes a vehicle comprising a first height sensor and a second height sensor coupled to a first axle, and a third height sensor coupled to a second axle, the height sensors configured to determine vertical positions, a rotation-rate sensor configured to sense a relative roll angle of a rotation of the vehicle about a longitudinal axis, machine readable instructions, and a control device coupled to the height sensors and the rotation-rate sensor, the machine readable instructions to cause the control device to determine an estimated vertical position of the second axle based on the vertical positions and the relative roll angle.

Example 2 includes the vehicle of example 1, wherein the machine readable instructions cause the control device to determine, based on a Kalman filter and the relative roll angle, an absolute roll angle.

Example 3 includes the vehicle of example 2, wherein the machine readable instructions cause the control device to determine the estimated vertical position further based on the absolute roll angle.

Example 4 includes the vehicle of example 1, wherein the machine readable instructions cause the control device to, based on the vertical positions and the estimated vertical position, adjust a suspension travel setpoint for a spring-damper unit of the vehicle.

Example 5 includes the vehicle of example 4, wherein the machine readable instructions cause the control device to determine an actual suspension travel of the spring-damper unit based on the vertical positions or the estimated vertical position of the vehicle.

Example 6 includes the vehicle of example 5, wherein the machine readable instructions cause the control device to adjust the suspension travel setpoint further based on a comparison of the determined actual suspension travel with the suspension travel setpoint.

Example 7 includes the vehicle of example 4, wherein the spring-damper unit includes a spring device and a damping device.

Example 8 includes the vehicle of example 1, wherein the height sensors are arranged at first, second, and third positions respectively, and wherein the machine readable instructions cause the control device to determine the estimated vertical position for a fourth position.

Example 9 includes the vehicle of example 8, wherein the first, second, third, and fourth positions are arranged at vertices of a trapezoid or a rectangle.

Example 10 includes the vehicle of example 8, wherein the third position and the fourth position are arranged symmetrically along a width of the vehicle with respect to an axle mid-point of the axle corresponding to the third height sensor.

Example 11 includes a method for operating a vehicle, the vehicle including a first height sensor and a second height sensor coupled to a first axle of the vehicle, a third height sensor coupled to a second axle of the vehicle, and a rotation sensor, the method comprising determining a first vertical position of the first axle based on first data from the first height sensor and the second height sensor, determining a relative roll angle of a rotation of the vehicle about a vehicle longitudinal axis based on second data from the rotation sensor, and estimating a second vertical position of the second axle, based on third data from the third height sensor and the second data.

Example 12 includes the method of example 11, further including determining an absolute roll angle of the vehicle based on a Kalman filter and the second data.

Example 13 includes the method of example 12, wherein estimating the second vertical position is further based on the absolute roll angle.

Example 14 includes the method of example 12, further including, based on the first vertical position and the second vertical position, adjusting a suspension travel setpoint for a spring-damper unit of the vehicle.

Example 15 includes the method of example 14, further including determining an actual suspension travel of the spring-damper unit based on the first vertical position or the second vertical position.

Example 16 includes the method of example 15, wherein adjusting the suspension travel setpoint for the spring-damper unit is further based on a comparison of the actual suspension travel with the suspension travel setpoint.

Example 17 includes an apparatus for adjusting a setpoint of a spring-damper unit of a vehicle, the apparatus comprising machine readable instructions, and programmable circuitry to execute the machine readable instructions to determine a first vertical position of a first axle based on first data from a first height sensor and a second height sensor, determine a roll angle of a rotation of the vehicle, determine a second vertical position of a second axle based on the first vertical position and the roll angle, and adjust the setpoint of the spring-damper unit based on the first vertical position, the second vertical position, and the roll angle.

Example 18 includes the apparatus of example 17, wherein the machine readable instructions cause the programmable circuitry to determine, based on a Kalman filter and the roll angle, an absolute roll angle.

Example 19 includes the apparatus of example 18, wherein the machine readable instructions cause the programmable circuitry to determine the second vertical position further based on the absolute roll angle.

Example 20 includes the apparatus of example 17, wherein the machine readable instructions cause the programmable circuitry to determine an actual suspension travel of the spring-damper unit based on the first vertical position and the second vertical position.

What is claimed is:

1. A vehicle comprising:
a first height sensor and a second height sensor coupled to a first position and a second position of a first axle, and a third height sensor coupled to third position of a second axle, the height sensors configured to determine vertical positions;
a rotation-rate sensor configured to sense a relative roll angle of a rotation of the vehicle about a longitudinal axis;
machine readable instructions; and
a control device coupled to the height sensors and the rotation-rate sensor, the machine readable instructions to cause the control device to determine an estimated vertical position for a fourth position of the second axle based on the vertical positions and the relative roll angle.

2. The vehicle of claim 1, wherein the machine readable instructions cause the control device to determine, based on a Kalman filter and the relative roll angle, an absolute roll angle.

3. The vehicle of claim 2, wherein the machine readable instructions cause the control device to determine the estimated vertical position further based on the absolute roll angle.

4. The vehicle of claim 1, wherein the machine readable instructions cause the control device to, based on the vertical positions and the estimated vertical position, adjust a suspension travel setpoint for a spring-damper unit of the vehicle.

5. The vehicle of claim 4, wherein the machine readable instructions cause the control device to determine an actual suspension travel of the spring-damper unit based on the vertical positions or the estimated vertical position of the vehicle.

6. The vehicle of claim 5, wherein the machine readable instructions cause the control device to adjust the suspension travel setpoint further based on a comparison of the determined actual suspension travel with the suspension travel setpoint.

7. The vehicle of claim 4, wherein the spring-damper unit includes a spring device and a damping device.

8. The vehicle of claim 1, wherein the first, second, third, and fourth positions are arranged at vertices of a trapezoid or a rectangle.

9. The vehicle of claim 1, wherein the third position and the fourth position are arranged symmetrically along a width of the vehicle with respect to an axle mid-point of the second axle.

10. A method for operating a vehicle, the vehicle including a first height sensor and a second height sensor coupled to a first axle of the vehicle, a third height sensor coupled to a second axle of the vehicle, and a rotation sensor, the method comprising:

determining a first vertical position of the first axle based on first data from the first height sensor and the second height sensor;

determining a relative roll angle of a rotation of the vehicle about a vehicle longitudinal axis based on second data from the rotation sensor; estimating a second vertical position of the second axle, based on third data from the third height sensor and the second data; and adjusting a suspension travel setpoint for a spring-damper unit of the vehicle based on the first vertical position and the second vertical position.

11. The method of claim 10, further including determining an absolute roll angle of the vehicle based on a Kalman filter and the second data.

12. The method of claim 11, wherein estimating the second vertical position is further based on the absolute roll angle.

13. The method of claim 10, further including determining an actual suspension travel of the spring-damper unit based on the first vertical position or the second vertical position.

14. The method of claim 13, wherein adjusting the suspension travel setpoint for the spring-damper unit is further based on a comparison of the actual suspension travel with the suspension travel setpoint.

15. An apparatus for adjusting a setpoint of a spring-damper unit of a vehicle, the apparatus comprising:

machine readable instructions; and programmable circuitry to execute the machine readable instructions to:

determine a first vertical position of a first axle based on first data from a first height sensor and a second height sensor;

determine a roll angle of a rotation of the vehicle;

determine a second vertical position of a second axle based on the first vertical position and the roll angle; and adjust the setpoint of the spring-damper unit based on the first vertical position, the second vertical position, and the roll angle.

16. The apparatus of claim 15, wherein the machine readable instructions cause the programmable circuitry to determine, based on a Kalman filter and the roll angle, an absolute roll angle.

17. The apparatus of claim 16, wherein the machine readable instructions cause the programmable circuitry to determine the second vertical position further based on the absolute roll angle.

18. The apparatus of claim 15, wherein the machine readable instructions cause the programmable circuitry to determine an actual suspension travel of the spring-damper unit based on the first vertical position and the second vertical position.

* * * * *